US006796757B1

(12) United States Patent
Way et al.

(10) Patent No.: US 6,796,757 B1
(45) Date of Patent: Sep. 28, 2004

(54) AMBULANCE COT LOCK

(75) Inventors: Christopher B. Way, Richland, MI (US); Clifford E. Lambarth, Portage, MI (US)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 10/399,793

(22) PCT Filed: Oct. 27, 2000

(86) PCT No.: PCT/US00/30204

§ 371 (c)(1), (2), (4) Date: Apr. 21, 2003

(87) PCT Pub. No.: WO02/34192

PCT Pub. Date: May 2, 2002

(51) Int. Cl.[7] .................................................. B60P 7/08

(52) U.S. Cl. .............................. 410/69; 410/7; 410/66; 410/77; 296/20

(58) Field of Search ................................ 410/7, 66, 69, 410/77, 80; 296/19, 20, 65.04; 248/500, 503, 503.1; 5/511

(56) References Cited

U.S. PATENT DOCUMENTS

| | | | | |
|---|---|---|---|---|
| 1,477,815 A | | 12/1923 | Denning | |
| 3,918,554 A | * | 11/1975 | Bourgraf et al. | |
| 4,076,268 A | | 2/1978 | Hart | |
| 4,115,884 A | * | 9/1978 | Keogh | |
| 4,265,478 A | | 5/1981 | Korsgaard | |
| 5,092,722 A | | 3/1992 | Reazer, III et al. | 410/104 |
| 5,205,601 A | | 4/1993 | Ferris | |
| 5,489,170 A | | 2/1996 | Inoue et al. | 410/7 |
| 5,494,386 A | * | 2/1996 | Paull | 410/77 |
| 5,628,595 A | | 5/1997 | Harris | 410/7 |
| 5,779,296 A | | 7/1998 | Hewko | |
| 5,913,559 A | | 6/1999 | Sexton et al. | |
| 6,352,396 B1 | * | 3/2002 | Budd et al. | 410/8 |

FOREIGN PATENT DOCUMENTS

| | | |
|---|---|---|
| DE | 197 30 189 | 2/1999 |
| EP | 0 128 845 | 12/1984 |

* cited by examiner

*Primary Examiner*—Stephen Gordon
(74) *Attorney, Agent, or Firm*—Flynn, Thiel, Boutell & Tanis, P.C.

(57) ABSTRACT

An ambulance cot frame securing system for a patient transport vehicle which includes a floor frame adapted to be secured to a floor of the patient transport vehicle. The floor frame has at a first end thereof a fixed angled restraint inclined upwardly and in a direction toward a second end of the floor frame to define an overhang spaced upwardly from the floor frame so as to provide a gap into which is adapted to be received a first part of the cot frame. The floor frame additionally has a releasable latch mechanism adapted to be releasably coupled to a second part of the cot frame so as to hold is the cot frame in a fixed lengthwise location relative to the floor frame. The securement system additionally has a self-activating locking mechanism activatable in response to a sudden burst of either acceleration or deceleration of the patient transport vehicle to additionally securely lock the first part of the cot frame in a fixed position relative to the patient transport vehicle.

11 Claims, 10 Drawing Sheets

AMBULANCE COT LOCK

FIELD OF THE INVENTION

This invention relates to securing systems and, more particularly, to an ambulance cot frame securing system for an ambulance or other type of patient transport vehicle.

BACKGROUND OF THE INVENTION

Ambulance cot frame securing systems are known, examples of which are U.S. Pat. Nos. 1,477,815, 5,092 722, 5,205,601 and 5,913,559. As the aforementioned patents illustrate, the cot frame securing systems are basically either floor mounted systems or wall mounted systems. A combination of floor and wall mounted systems are also known.

It is widely accepted that ambulance cots supporting patients thereon need to be firmly restrained in the ambulance or other type of patient transport vehicle in order to keep the ambulance cot firmly restrained in the event that the vehicle undergoes sudden driving maneuvers, or crashes. When a rapid change of velocity occurs, such as will occur during a crash or impact, significant acceleration or deceleration to the patient transport vehicle occurs to cause forces to be applied to the ambulance cot frame causing it to bend, when only one end thereof is secured in place, under the G-force caused by the rapid change in velocity. This distortion in the cot frame will cause the frame to move from its normal engagement with the securing structure on the floor of the patient transport vehicle. The ambulance cot securement mechanism must be able to hold the ambulance cot in place during acceleration forces of 20 G's in the forward direction, 10 G's in the vertical direction, 10 G's in the lateral direction and 10 G's in the rearward direction, to meet the nationally recognized crash/impact standards.

The mechanism for facilitating the aforesaid securement of the ambulance cot frame to the ambulance or other type of patient transport vehicle is expensive and requires operable mechanisms to facilitate the securement mechanism in place during travel of the vehicle. It has been experienced that these mechanisms, over time, operate hesitatingly which is unacceptable in emergency situations.

Thus, it is desirable to provide an ambulance cot frame securing system that will accommodate cot frame distortions during periods of time where there occurs a sudden acceleration or deceleration by the patient transport vehicle. Furthermore, it is desirable to provide an ambulance cot frame securing system for a patient transport vehicle which facilitates only during instances where G forces in at least one of several specific directions, caused by a rapid change in velocity of the patient transport vehicle, exceeds a predetermined value to cause a self-activating, inertia responsive, locking mechanism to be deployed to lock the cot frame at the other end, thus at both ends, to the vehicle. Otherwise, and under normal driving conditions, the cot frame is secured only at one end for preventing movement of the cot frame relative to the floor along a direction parallel to a longitudinal axis of the cot frame.

SUMMARY OF THE INVENTION

The objects and purposes of the invention are met by providing an ambulance cot frame securing system for a patient transport vehicle which includes a floor frame adapted to be secured to a floor of the patient transport vehicle. The floor frame has at a first end thereof a fixed angled restraint inclined upwardly and in a direction toward a second end of the floor frame to define an overhang spaced upwardly from the floor frame so as to provide a gap into which is adapted to be received a first part of the cot frame. The floor frame additionally has a releasable latch mechanism adapted to be releasably coupled to a second part of the cot frame so as to hold the cot frame in a fixed lengthwise location relative to the floor frame. The securement system additionally has a self-activating, inertia responsive, locking mechanism activatable in response only to acceleration or deceleration G forces on the patient transport vehicle which exceed a predetermined value to additionally securely lock the first part of the cot frame relative to the patient transport vehicle.

BRIEF DESCRIPTION OF THE DRAWINGS

Other objects and purposes of the invention will be apparent to persons acquainted with apparatus of this general type upon reading the following specification and inspecting the accompanying drawings, in which.

DETAILED DISCUSSION

Figure 1:
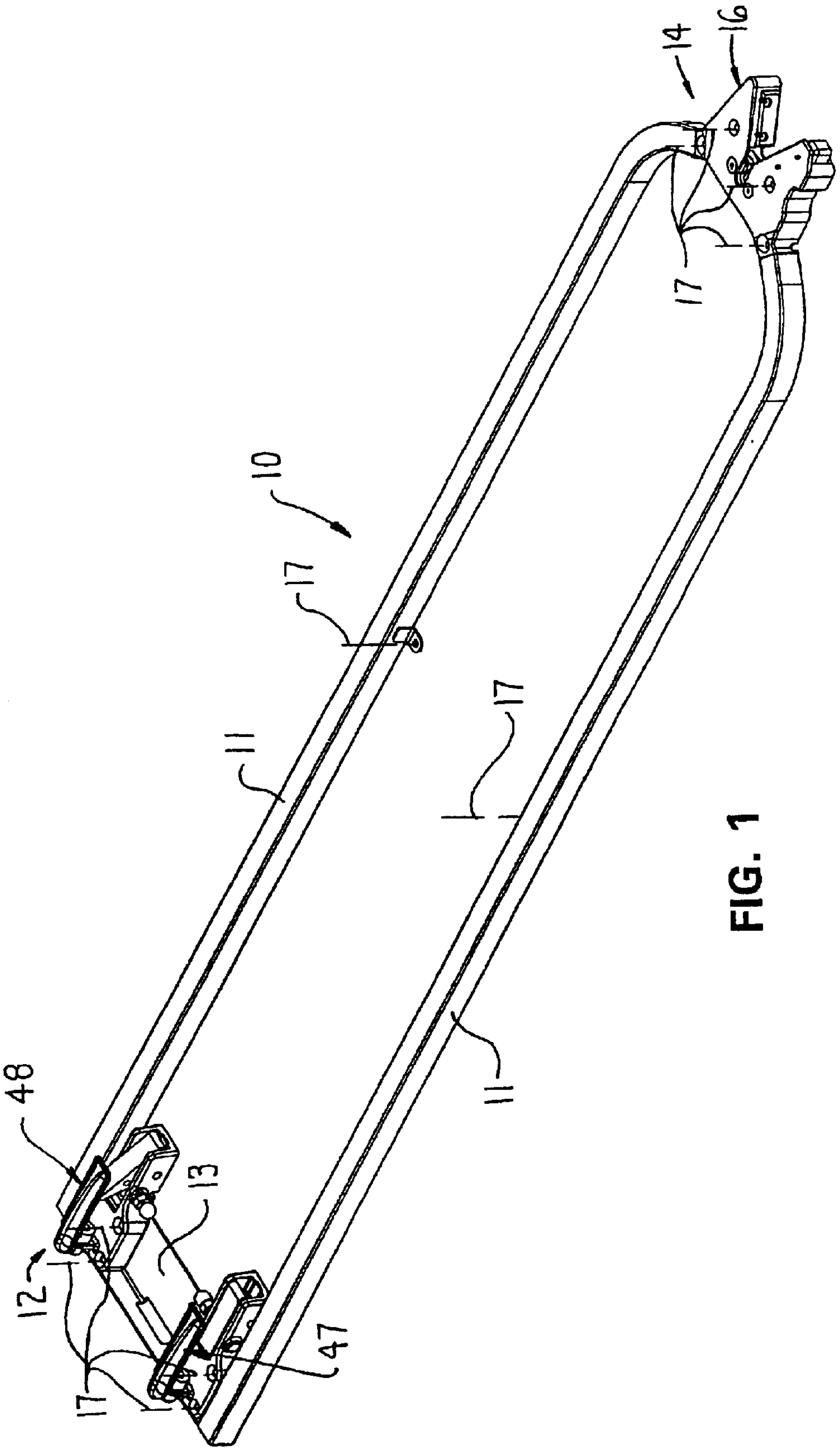
FIG. 1 is an isometric view of an ambulance cot frame securing system embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. The words "front" and "rear" will refer to the patient transport vehicle and directions relative to the vehicle configuration. Such terminology will include derivatives and words of similar import.

An ambulance cot frame securing system 10 is illustrated in FIG. 1 and includes a pair of parallel elongate frame members 11 interconnected at a first end 12 by a plate-like member 13 and at a second rear (right) front (left) end 14 by a releasable latch mechanism 16. The ambulance cot frame securing mechanism 10 illustrated in FIG. 1 is adapted to be secured to the floor of a patient transport vehicle utilizing a plurality of bolts (not illustrated) received in a plurality of holes schematically indicated at various locations by center lines 17.

The releasable latch mechanism 16 is oriented adjacent a rear access opening into the cargo area of the patient transport vehicle and can be of any conventional type adapted to be releasably securable to a downwardly depending pin or post provided as standard equipment on ambulance cot frames. The downwardly depending pin is generally circular in cross-section and is indicated at 18 in FIGS. 2, 4 and 5. The releasable latch mechanism 16 includes a latch frame 19 secured to the frame members 11 by fasteners 21. The latch frame 19 includes a pair of opposing surfaces 22 which serve to guide the pin 18 into the pin receiving area 23 whereat is located a releasable latch 24.

Figure 2:
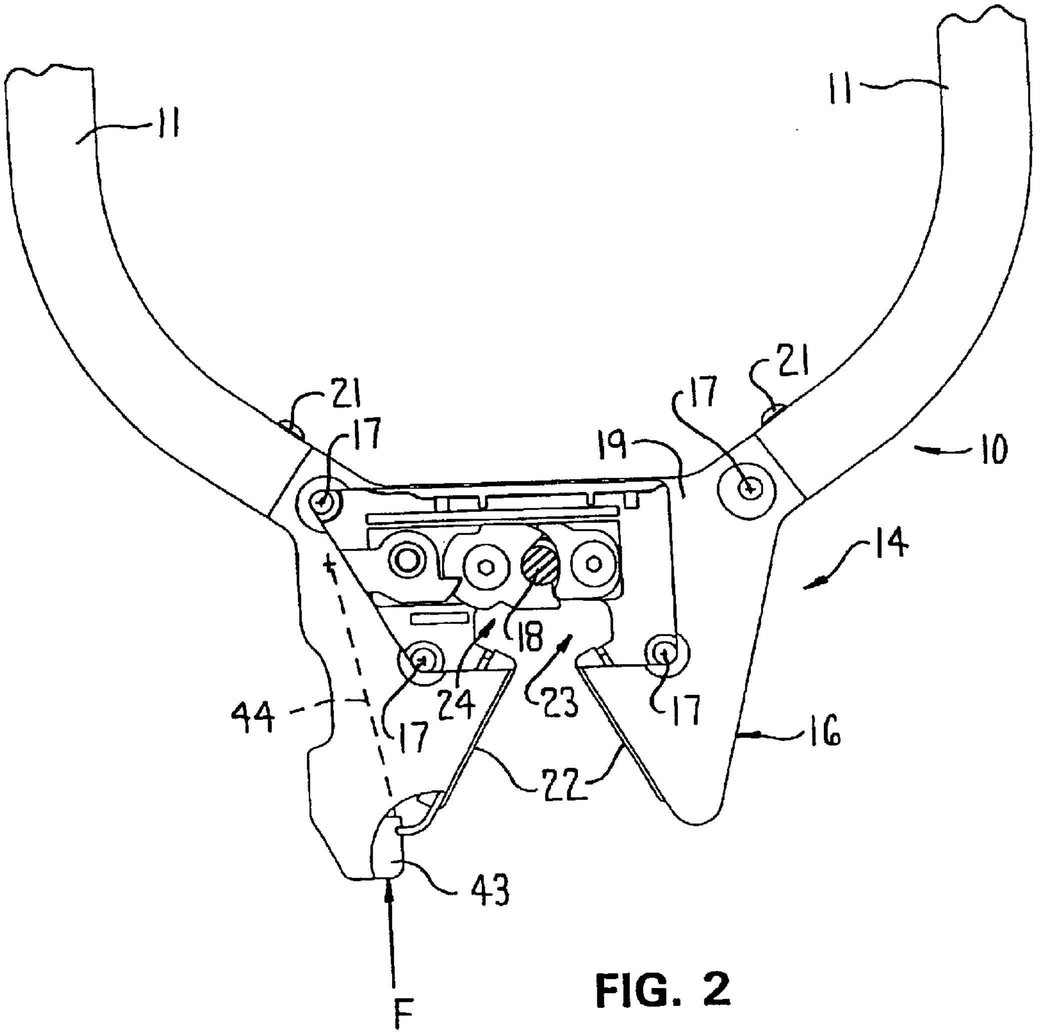
FIG. 2 is an enlarged top view of a fragment of the cot frame securing system illustrated in FIG. 1.
Figure 3:
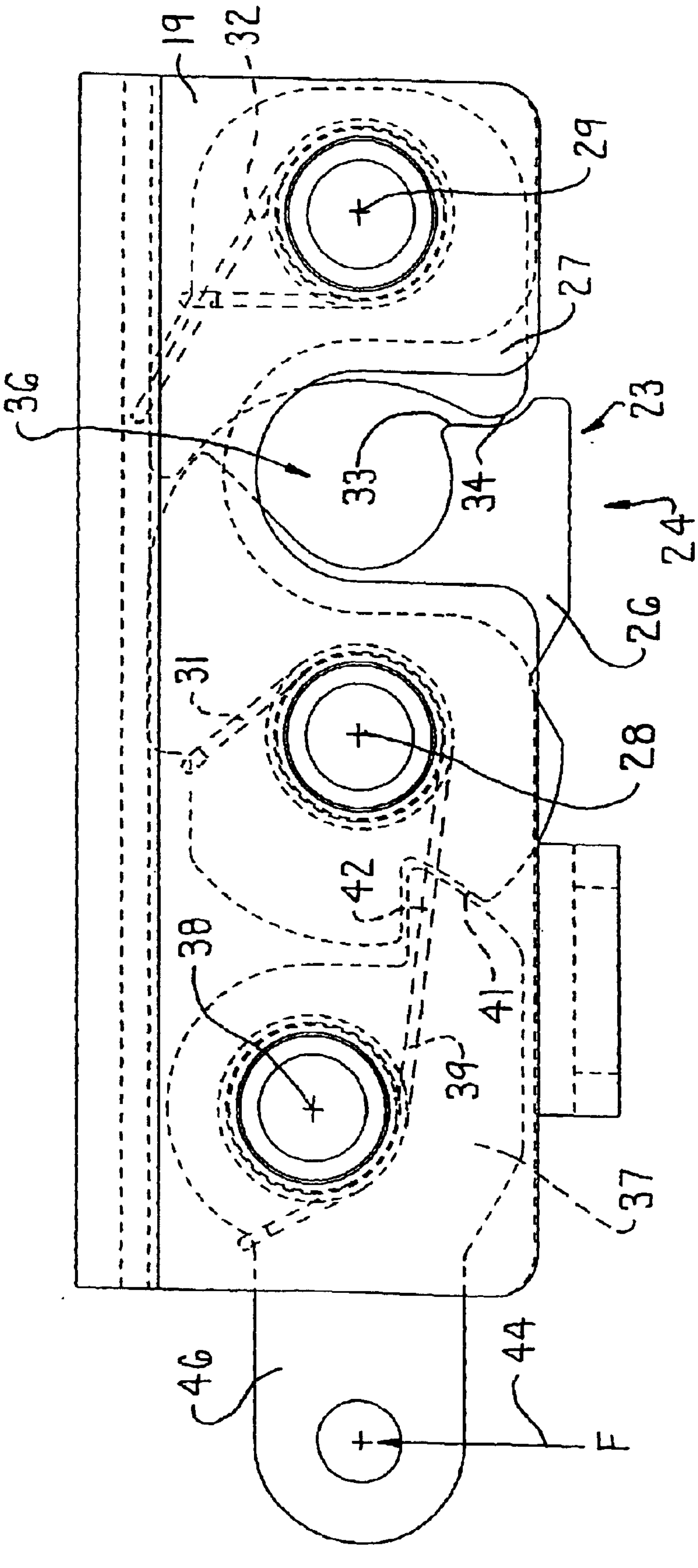
FIG. 3 is a top view of a releasable latch mechanism oriented adjacent the rear access opening into the interior of a patient transport vehicle.

The latch 24, which is illustrated in more detail in FIG. 3, includes a pair of rotatably supported locking members 26 and 27 each supported on respective axles 28 and 29. The locking member 26 is urged in a clockwise direction by a torsion spring 31 whereas the locking member 27 is urged in a counter-clockwise direction by a torsion spring 32. The locking members 26 and 27 have, respectively, mutually opposing surfaces 33 and 34, when in the closed position thereof illustrated in FIG. 3, to close off the opening 36 in the latch frame 19 when the pin 18 on the cot is received therein as illustrated in FIG. 2. The locking members 26 and 27 are prevented from moving in their respective opposite rotative directions by a cam member 37 rotatably supported on an axle 38 and urged in a counter-clockwise direction about the axle 38 by a torsion spring 39. The locking member 26 has a recess 41 in a peripheral edge thereof into which is received a tongue 42 on the cam member 37.

Figure 4:
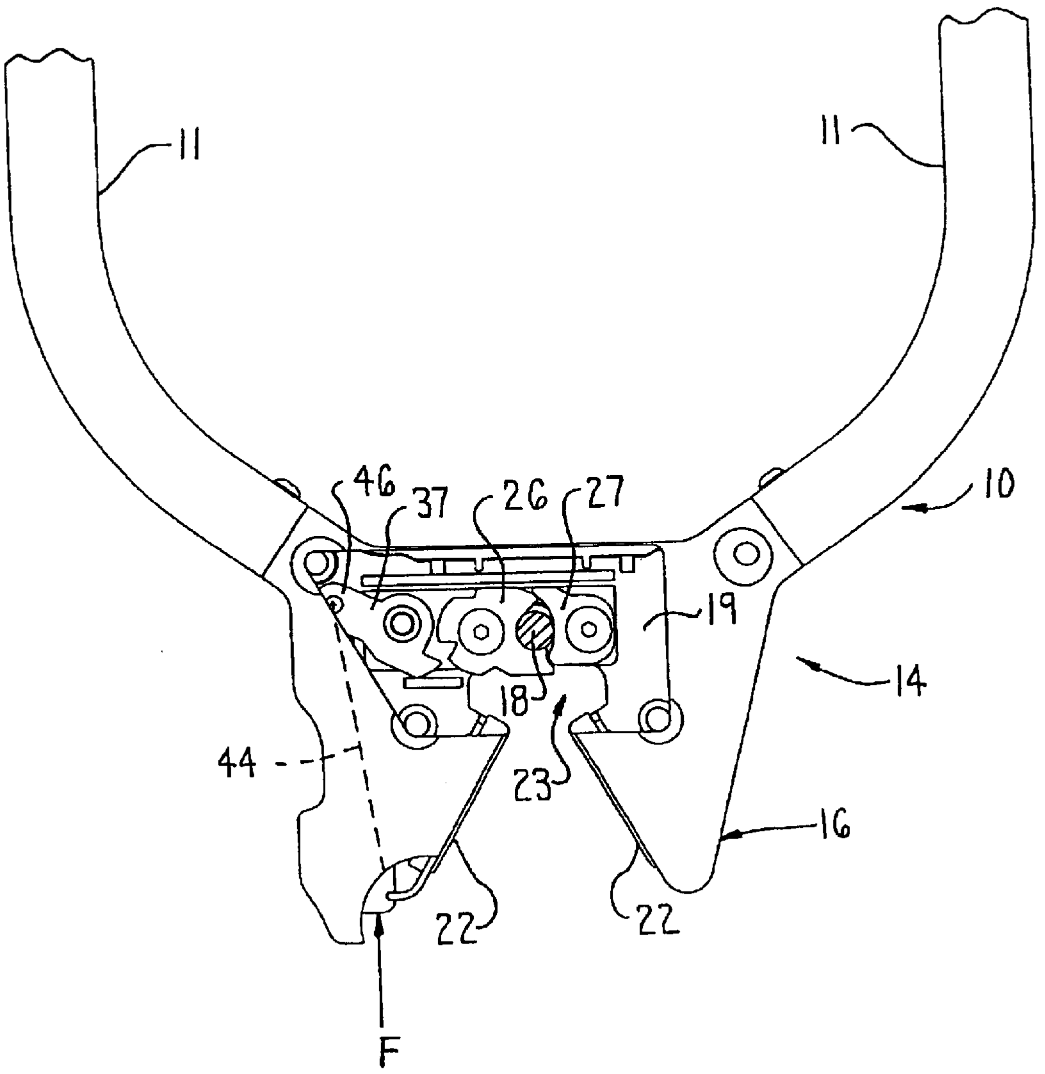
FIG. 4 is a top view similar to FIG. 2.
Figure 5:
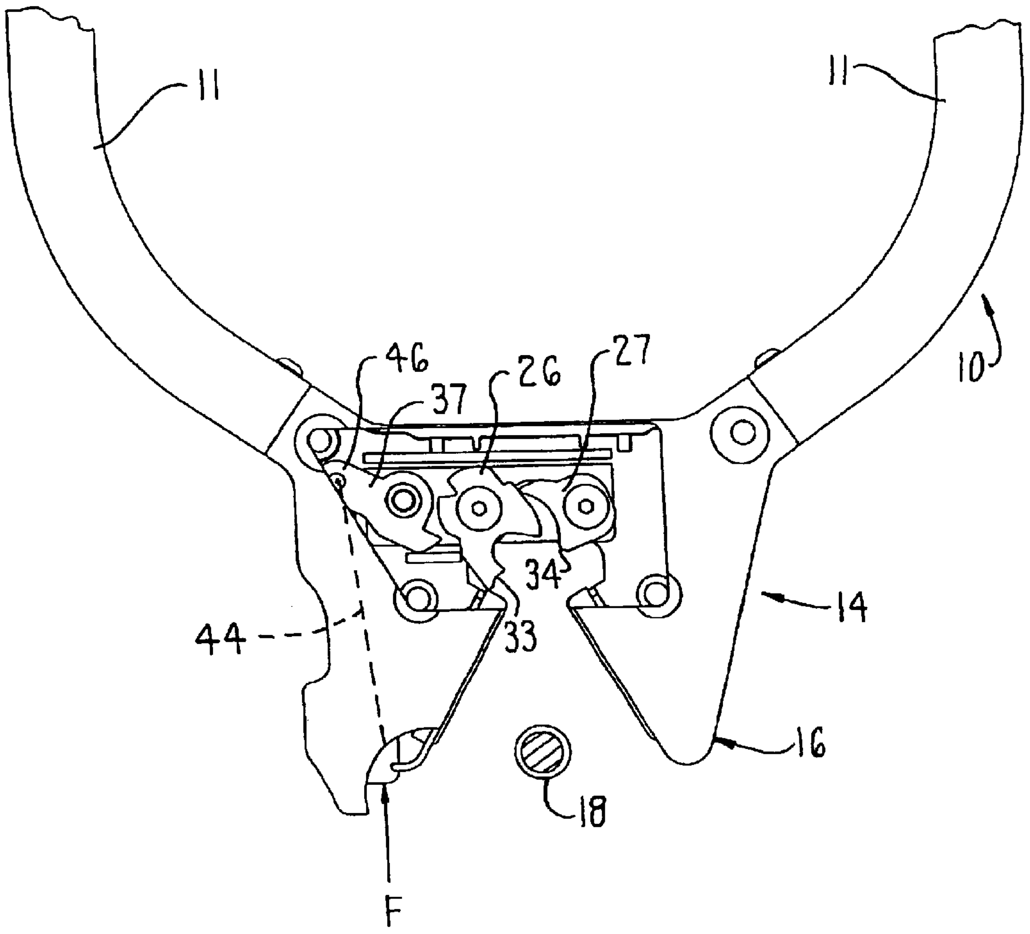
FIG. 5 is a top view similar to FIG. 2.

The latch frame 19 also has a push button 43 reciprocally mounted thereon which is operatively connected by a link 44, schematically illustrated in FIGS. 2, 4 and 5, to an extension 46 on the cam member 37. Upon manually pushing the push button 43 in the direction of the arrow F, a force is transmitted through the link 44 to the extension 46 to urge the cam member 37 clockwise against the urging of the torsion spring 39 to release the locking member 26. As a result, locking members 26 and 27 will spring open to the FIG. 5 position so that the pin 18 on the cot can be urged toward the access opening into the cargo area of a patient transport vehicle as depicted by a movement of the cot pin from the FIG. 4 position to the FIG. 5 position.

The above-described releasable latch mechanism 16 is only one exemplary embodiment for securing the pin 18 on the cot to the ambulance cot frame securing system 10. Other varieties of releasable latch mechanisms can also be employed.

It is to be understood that the locking members 26 and 27 remain in the open position illustrated in FIG. 5 due to the continual urging of the torsion springs 31 and 32. Only when a pin 18 enters the area between the two locking members 26 and 27 are they rotated to the closed position illustrated in FIG. 3 so that the tongue 42 can enter the recess 41 to lock the locking members 26 and 27 in a cot pin holding position illustrated in FIG. 2.

Referring to the first front end 12 of the ambulance cot frame securing system 10, there is provided on the plate 13 a pair of laterally spaced cot frame hold-down members 47 and 48. The left cot frame hold-down member 47 is illustrated in an initial position whereas the right cot frame hold-down member 48 is illustrated in a tripped position, both positions of which will be explained in more detail below. It is to be understood that it generally will be the case where both cot frame hold-down members 47 and 48 will simultaneously be in the same position, namely, an initial position such as is illustrated at the left side of FIG. 1 and a tripped position illustrated at the right side of FIG. 1.

Turning now in more detail to the structure of each cot frame hold-down member 47 and 48, FIGS. 6–9 illustrate and structure thereof. More specifically, and since each cot frame hold-down mechanism 47 and 48 are the mirror image of each other, only one such cot frame hold-down member, such as the hold-down member 47, will be described in detail.

Figure 6:
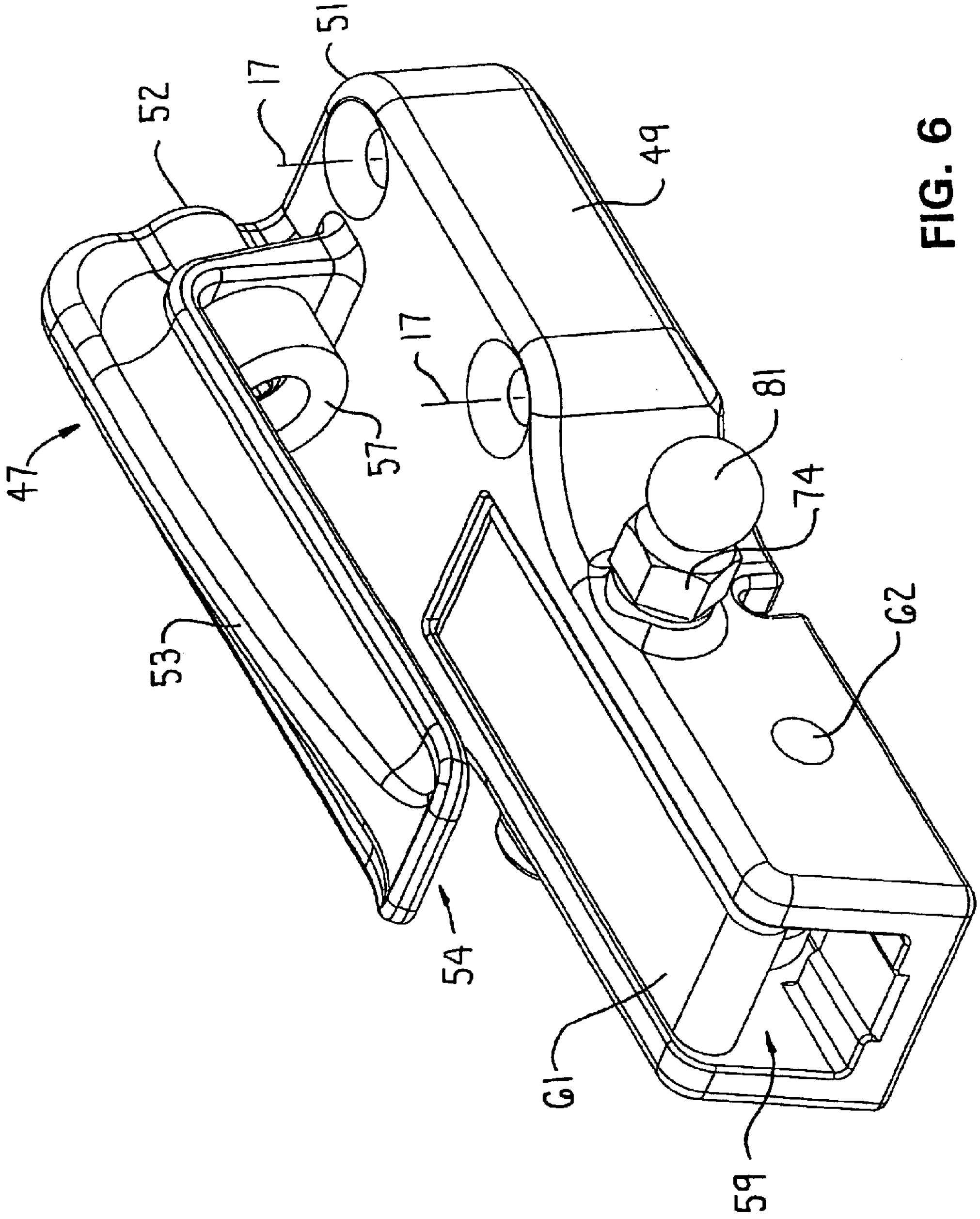
FIG. 6 is an enlarged isometric fragment of a part of the ambulance cot frame securing system in a first position thereof.
Figure 7:
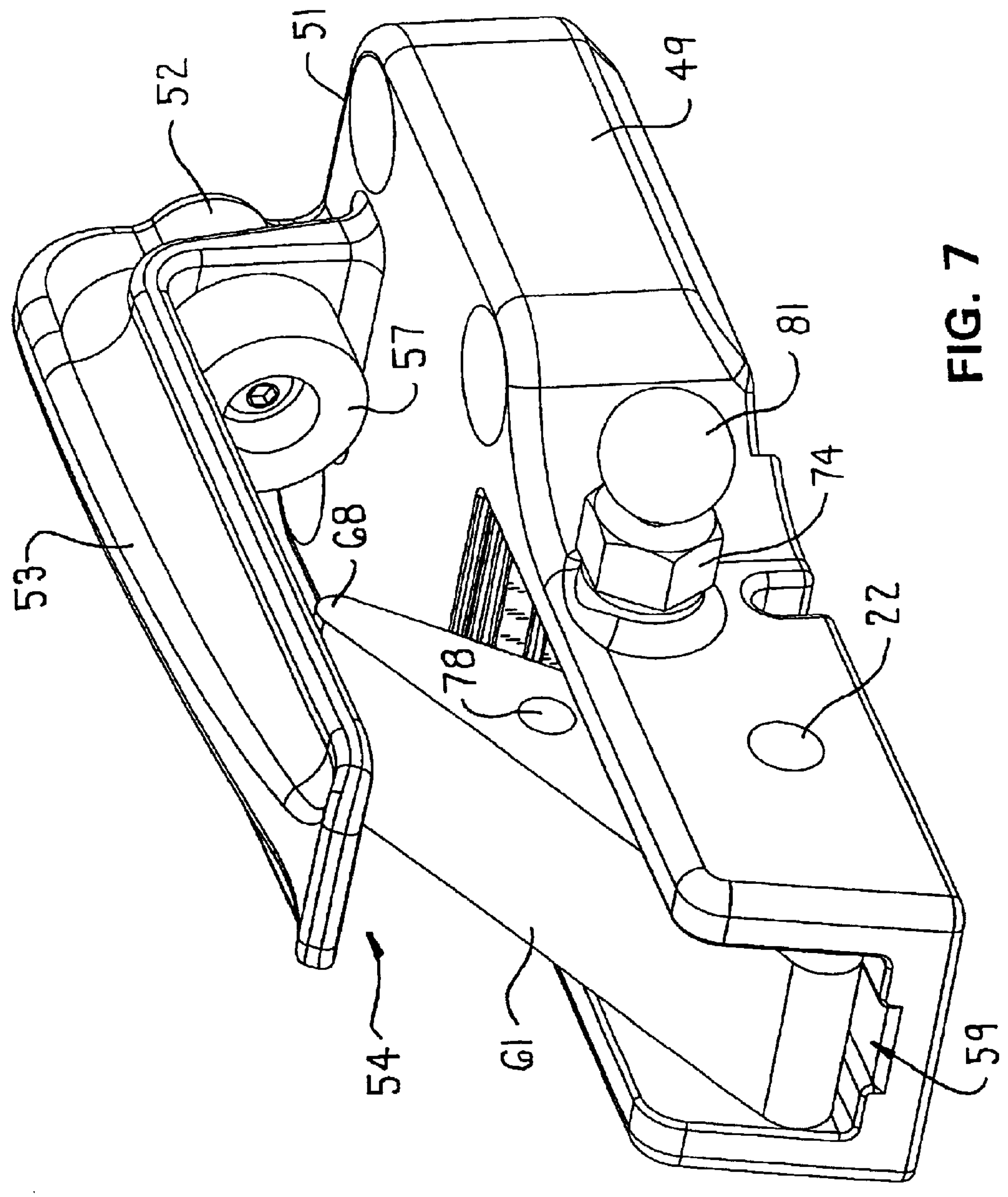
FIG. 7 is a view similar to FIG. 6 but in a second position thereof.

Referring to FIG. 6, the cot frame hold-down member 47 includes a base 49 configured for securement to the plate 13 using the same fasteners that effect a fastening of the securing system 10 to the floor of the patient transport vehicle through opening indicated by axes 17. The forward end 51 of the base 49, corresponding to the forward portion of the cargo area of the patient transport vehicle, includes an upstanding column 52 having at upper end thereof a cantilevered member 53 overhanging the base 49 so as to define a gap 54 between the underside of the cantilevered member 53 and the upper surface of the base 49 into which is adapted to be received a cot frame part 56 schematically illustrated in FIGS. 8 and 9. A rubber or other elastic material bumper 57 is secured to the upstanding column 52 within the gap 54 by a fastener 58.

Figure 8:
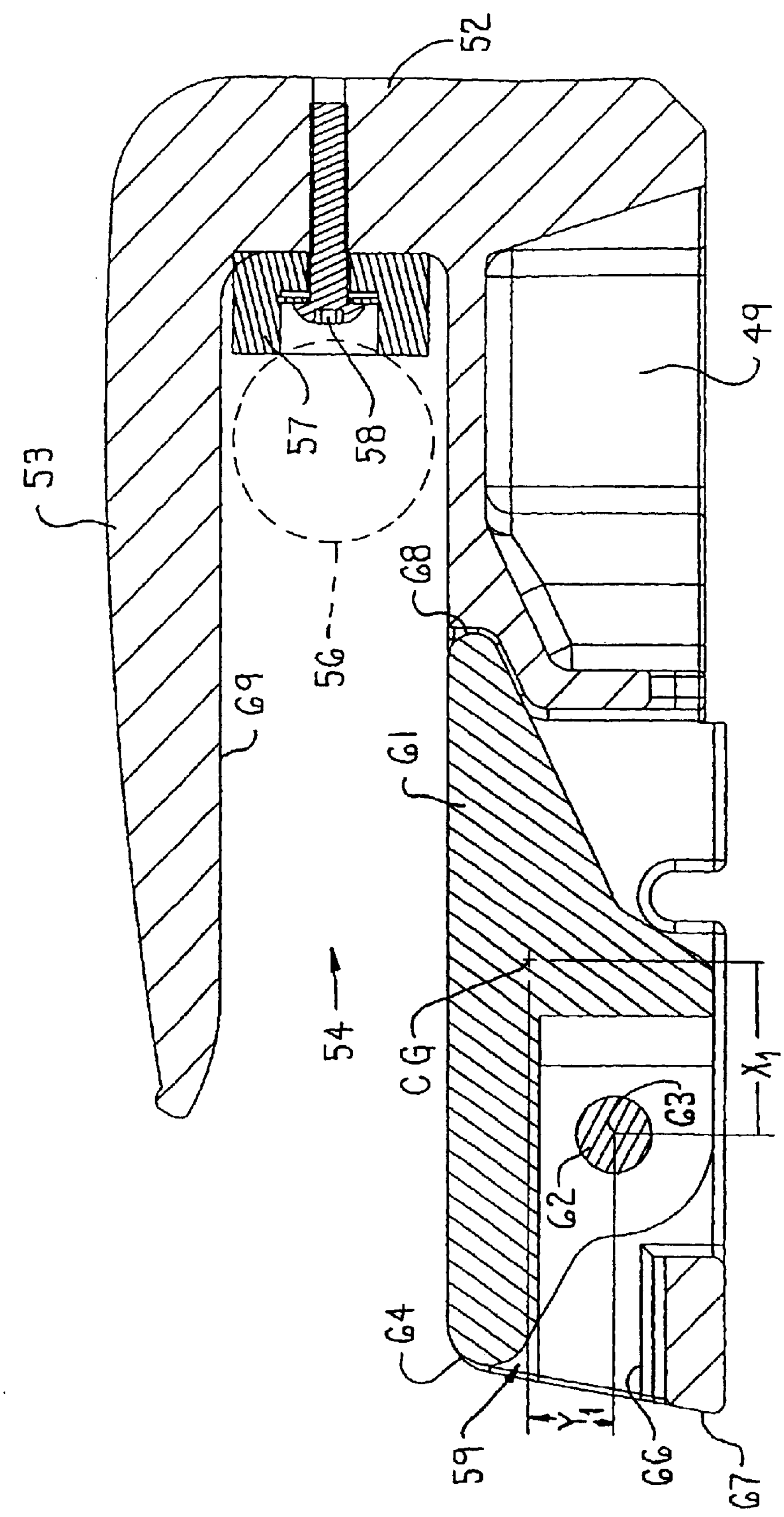
FIG. 8 is a lengthwise central sectional view through the structure illustrated in FIG. 6.

Rearwardly of the base 49, namely in a direction away from the upstanding column 52, there is provide an elongate trough 59 into which is located an elongate lever arm 61 pivotally secured to the base 49 about an axle 62 which extends perpendicular to the longitudinal axis of the ambulance cot frame securing system 10. The elongate lever arm 61 is configured to have a center of gravity CG initially oriented forwardly of the axis 63 of the axle 62 a distance X, and above the axis 63 a distance Y, as illustrated in FIG. 8. In this particular embodiment, and when the elongate lever arm 61 is in the initial position thereof illustrated in FIG. 8, the distance $X_1$ exceeds the distance $Y_1$. The distances $X_1$ and $Y_1$ serve to regulate the amount of acceleration in the direction of left to right in FIG. 8 that is needed in order to deploy the elongate lever arm 61 from the position illustrated in FIG. 8 to the position illustrated in FIG. 9. Similarly, if the patient transport vehicle were moving in the reverse direction and collided with an abutment, a deceleration force would exist in the reverse direction causing the elongate lever arm 61 to move from the FIG. 8 position to the FIG. 9 position. The orientation of the center of gravity as aforesaid, and an adjustment of the spring force of a spring 76 described in more detail below, causes the G force required to deploy the elongate lever arm 61 to be preset to exceed a predetermined value in the forward and rearward directions, such as 5 G. The elongate lever arm 61 is, therefore, a self-activating, inertia responsive, cot locking mechanism.

Figure 9:
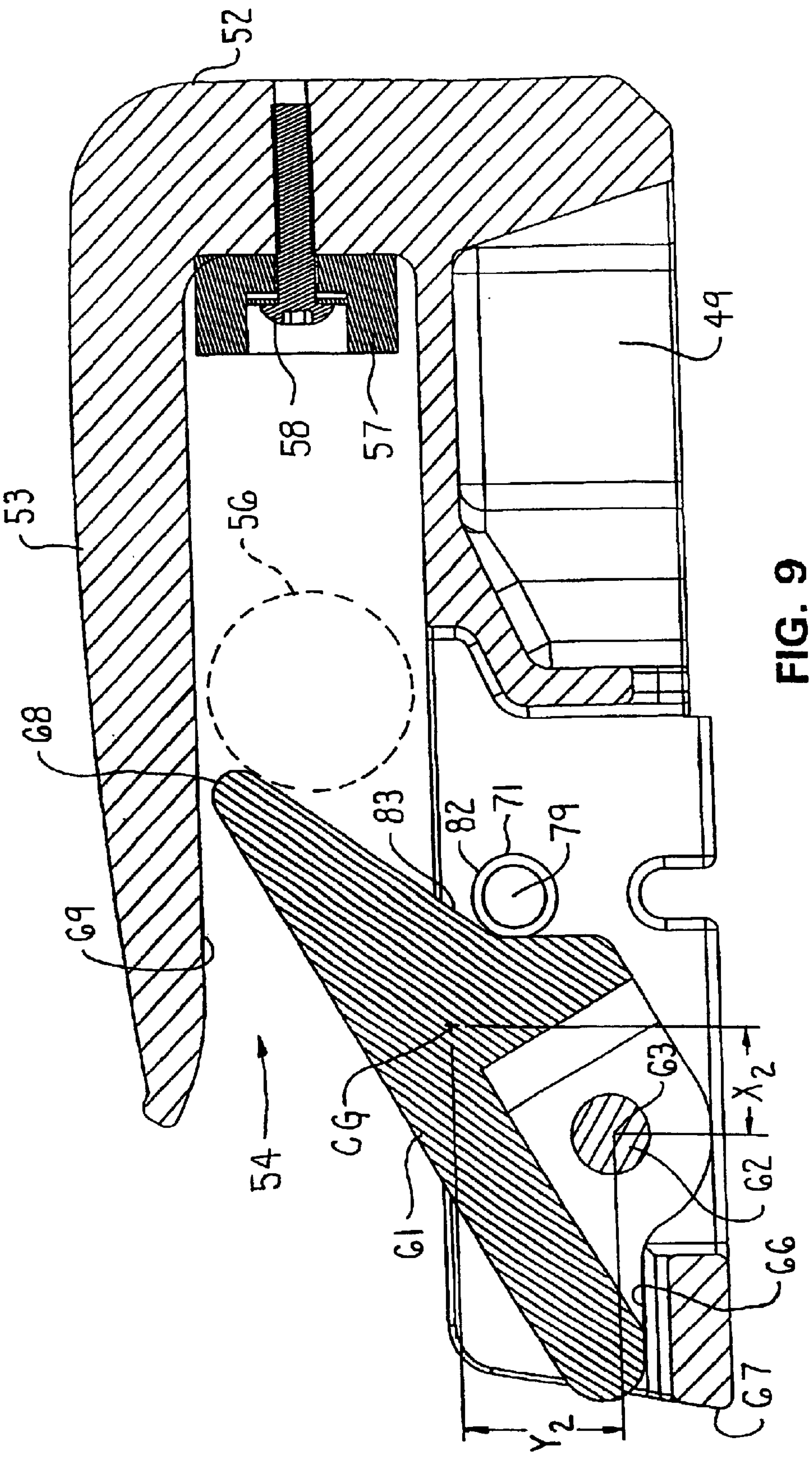
FIG. 9 is a central longitudinal sectional view through the structure illustrated in FIG. 7.

In the deployed position of the elongate lever arm 61 as illustrated in FIG. 9, it will be noted that the center of gravity is still spaced forwardly of the axis 63 of the axle 62 a distance $X_2$ less than the distance $X_1$ mentioned above. Similarly, the dimension $Y_2$ in the deployed position of the elongate lever arm 61 is greater than the dimension $Y_1$. As a result, there will exist a moment urging the elongate lever arm 61 back toward its initial position illustrated in FIG. 8, if the patient transport vehicle is still in the upright position, due to the influence of gravity thereon.

The rear end 64 of the elongate lever arm 61 is adapted to abut a surface 66 also adjacent the rear end 67 of the base 49. The elevation of the surface 66 and the location of the rear end 64 of the elongate lever arm 61 are proportioned so as to define a limit of inclination of the elongate lever arm when in the deployed position illustrated in FIG. 9 so that the front end 68 of the elongate lever arm 61 becomes oriented closely adjacent the downwardly facing surface 69 of the cantilever member 53.

Once the elongate lever arm 61 has moved to the deployed position illustrated in FIG. 9, it is desirable that the lever arm 61 be maintained in the deployed position. To accomplish this task, there is provided a latch pin 71 (see FIGS. 10–12) reciprocally mounted in a hole 72 provided in the base 49, the axis of the hole 72 extends in a direction parallel to the axis 63. In this particular embodiment, the hole 72 has an internal thread 73 into which is received an externally threaded plug 74 having the latch pin 71 reciprocally supported therein and resiliently urged by a spring 76 into engagement with a side wall 77 of the elongate lever arm 61. In this particular embodiment, a detent 78 is provided in the side wall 77 of the lever arm 61 and the nose 79 of the latch pin 74, which is spherical in configuration, is received into the detent 78. The spring force of the spring 76 urging the spherical nose 79 into the detent 78 is adjusted in a conventional way to prevent inadvertent deployment of the lever arm 61 from the position illustrated in FIG. 8 to the position illustrated in FIG. 9 until the G force on the patient transport vehicle exceeds a predetermined value in the vertical direction, such as 5 G. A manually engagable handle 81 is provided on the end of the latch pin 71 remote from the elongate lever arm 61. By manually pulling outwardly (leftwardly in FIG. 10) on the handle 81, the spring 76 can be compressed to effect a withdrawal of the pin into the hole 72 for reset purposes described below.

Figure 12:
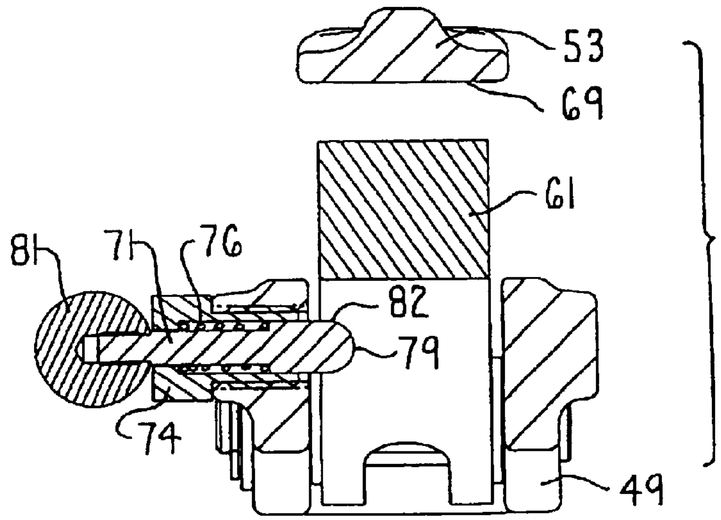

In operation of the latch pin 71, the latch pin 71 will be urged to a fully extended position illustrated in FIG. 12 wherein the nose 79 thereof is in the path of movement of the elongate lever arm 61 thereby preventing it from returning from the deployed position of FIG. 9 to the initial position thereof illustrated in FIG. 8. The peripheral surface 82 of the latch pin 71 as depicted in FIG. 9 engages an opposing surface 83 on the underside of the elongate lever arm 61. In order to facilitate removal of the cot frame part 56 from its location between the deployed lever arm 61 and the forward end 68 thereof and the bumper 57, it is necessary to reset the self-actuating locking mechanism 10 by pulling leftwardly (FIG. 12) on the handle 81 to urge the latch pin 71 leftwardly until the nose 79 thereof is moved leftwardly beyond the surface 77 so that the elongate lever arm 61 will be free to rotate clockwise about the axis 63 in FIG. 9 due to the aforementioned position of the center of gravity CC being oriented forwardly of the axis 63 of the axle 62.

Figure 10:
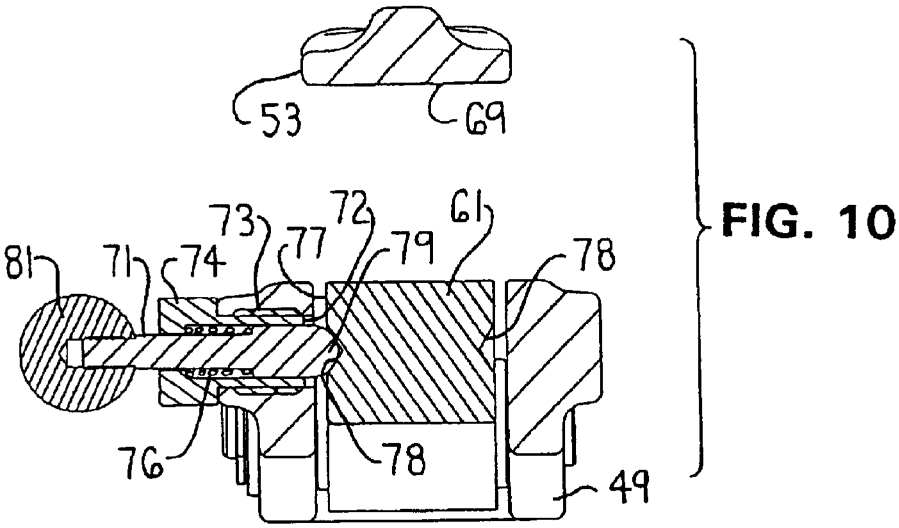
FIGS. 10–12 illustrate an operative sequence of the structure illustrated in FIGS. 6–9.
Figure 11:
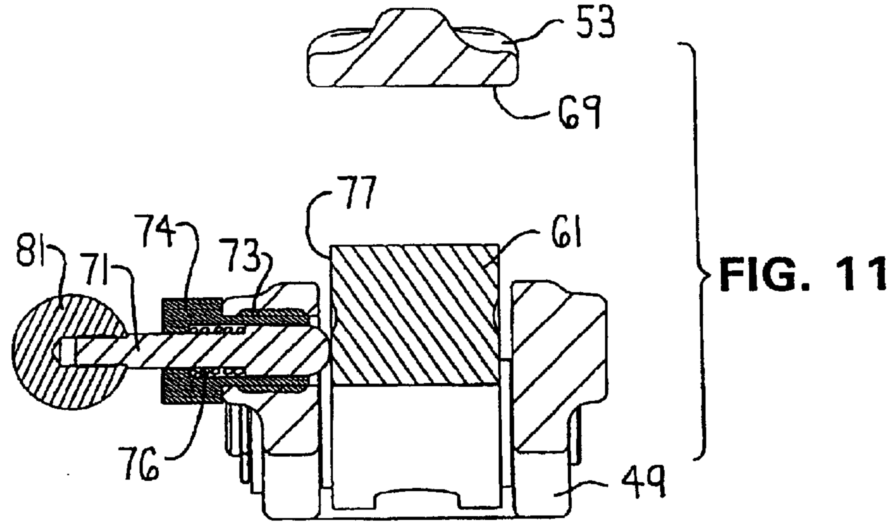

During a rapid change in velocity of the patient transport vehicle indicative of an impact/crash, the cot frame will distort due to the rear end thereof being fixedly secured to the floor of the vehicle by reason of the pin 18 being engaged in the latch 24. As a result, the cot frame part 56 will tend to move, due to flexure of the entire cot frame, rearwardly out from under the cantilever member 53. In order to prevent this from happening, it is necessary to timely deploy the elongate lever arm 61, due to a strategic placement of the elongate lever arm 61 on the base 49, from the FIG. 8 position to the FIG. 9 position, but only in response to G forces which exceed the aforesaid preset level, so that the cot frame part 56 will engage the front end 68 of the lever arm 61 as depicted in FIG. 9. The deployed latch pin 71, as depicted in FIG. 12, will hold the deployed elongate lever arm 61 in the position illustrated in FIG. 9. The only way that the ambulance cot frame will be able to be removed from the cargo area of the patient transport vehicle will be for an attendant to manually pull on the handles 81 on each hold-down member 47, 48 to retract the latch pin 71 to facilitate the return under the influence of gravity of the elongate lever arm 61 from the deployed position illustrated in FIG. 9 back to the initial position illustrated in FIG. 8. Thereafter, the manual engagement of the handle 81 can be released so that the latch pin 71 will be driven by the spring 76 until the nose 79 thereof reenters the detent 78 as depicted in FIG. 10.

In instances where the patient transport vehicle becomes oriented upsidedown, it will be desirable for the elongate lever arm 61 to deploy. In this instance, the deployment will occur only in response to a rapid change in velocity of the patient transport vehicle, as aforesaid, causing the G force on the cot to exceed the predetermined value and in a direction having a component of motion that is perpendicular away from the floor to prevent the free removal of the cot frame part 59 from the gap 54 due to deflection of the cot frame as described above.

Although a particular preferred embodiment of the invention has been disclosed in detail of illustrative purposes, it will be recognized that variations or modifications of the disclosed apparatus, including the rearrangement of parts, lie within the scope of the present invention.

What is claimed is:

1. In an ambulance cot frame securing system for a patient transport vehicle comprising a floor frame adapted to be secured to a floor of the patient transport vehicle, said floor frame having at a first end thereof a fixed angled restraint inclined upwardly and in a direction toward a second end of said floor frame to define an overhang spaced upwardly from said floor frame so as to provide a gap into which is adapted to be received a first part of the cot frame, said floor frame additionally having a releasable latch mechanism adapted to be releasably coupled to a second part of the cot frame so as to hold the cot frame in a fixed lengthwise location relative to said floor frame, the improvement comprising a self-activating, inertia responsive, locking mechanism activatable in response only to a rapid change in velocity to effect a preventing of the free removal of said first part of the cot frame from beneath said overhang.

2. The ambulance cot frame securing system according to claim 1, wherein said self activating locking mechanism includes an elongate lever arm pivotally supported between said floor frame and said overhang for movement about a pivot axis between first and second positions, said first position facilitating free and unobstructed movement of the first part of the cot frame, when oriented beneath said overhang and said releasable latch mechanism is released, toward said second end of said floor frame, said second position obstructing movement of the first part of the cot frame, when oriented beneath said overhang, toward said second end.

3. The ambulance cot frame securing system according to claim 2, wherein said first end is a forward end and said second end is a rearward end; and wherein said elongate lever arm has a center of gravity oriented to be spaced forwardly of and above said pivot axis.

4. The ambulance cot frame securing system according to claim 3, wherein a longitudinal axis of said elongate lever arm is oriented in a plane parallel to a plane of said floor frame and has a sufficient length on a side forwardly of said pivot axis to cause a forward distal end of said elongate lever arm to become oriented out of said plane that is parallel to said floor frame and adjacent said overhang when in said second position thereof.

5. The ambulance cot frame securing system according to claim 3, wherein said center of gravity of said elongate lever arm is, when in said first position thereof, spaced further forward of a vertical plane containing said pivot axis than the spacing above a horizontal plane containing said pivot axis.

6. The ambulance cot frame securing system according to claim 5, wherein said center of gravity of said elongate lever arm is, when in said second position thereof, spaced further above said horizontal plane containing said pivot axis than the spacing forwardly of said vertical plane containing said pivot axis.

7. The ambulance cot frame securing system according to claim 2, wherein said self-activating locking mechanism further includes a latch pin reciprocally mounted on said floor frame for movement in a direction parallel to said pivot axis of said elongate lever arm, an elastically yieldable member operatively coupled to said latch pin for continually urging said latch pin axially toward and into engagement with a side wall of said elongate lever arm when said elongate lever arm is in said first position thereof to establish a predetermined value of G force at which said elongate lever arm will be allowed to pivot to said second position.

8. The ambulance cot frame securing system according to claim 7, wherein said latch pin is movable axially under an influence of said elastically yieldable member to a position beneath said elongate lever arm when said elongate lever arm is in said second position thereof to prevent unwanted movement of said elongate lever arm from said second position toward said first position thereof.

9. The ambulance cot frame securing system according to claim 8, wherein said latch pin includes a handle for facilitating manual engagement thereof to effect an axial movement of said latch pin against an urging of said elastically yieldable member to withdraw said latch pin from beneath said elongate lever arm to enable a movement of said elongate lever arm from said second position toward said first position.

10. The ambulance cot frame securing system according to claim 7, wherein the predetermined value is present by said elastically yieldable member at 5 G.

11. The ambulance cot frame securing system according to claim 1, wherein the rapid change in velocity is indicative of a crash or impact.

* * * * *